(12) United States Patent
Yang et al.

(10) Patent No.: US 9,415,749 B2
(45) Date of Patent: Aug. 16, 2016

(54) GENERAL WIPER CONNECTING APPARATUS

(71) Applicant: DANYANG UPC AUTO PARTS CO.,LTD., Danyang,Jiangsu (CN)

(72) Inventors: Chih-Ming Yang, Taipei (TW); Chuan-Chih Chang, Taipei (TW)

(73) Assignee: DANYANG UPC AUTO PARTS CO., LTD., Danyang, Jiangsu (CN)

( * ) Notice: Subject to any disclaimer, the term of this patent is extended or adjusted under 35 U.S.C. 154(b) by 373 days.

(21) Appl. No.: 14/152,018

(22) Filed: Jan. 10, 2014

(65) Prior Publication Data

US 2014/0215747 A1      Aug. 7, 2014

(30) Foreign Application Priority Data

Feb. 7, 2013   (CN) ...................... 2013 2 0070768 U

(51) Int. Cl.
*B60S 1/38*      (2006.01)
*B60S 1/40*      (2006.01)

(52) U.S. Cl.
CPC .............. *B60S 1/4003* (2013.01); *B60S 1/3867* (2013.01); *B60S 1/407* (2013.01); *B60S 1/4038* (2013.01); *B60S 1/4067* (2013.01); *B60S 2001/4051* (2013.01)

(58) Field of Classification Search
CPC ...... B60S 1/4003; B60S 1/3867; B60S 1/407; B60S 1/4067; B60S 1/4074
USPC .......................................... 15/250.32, 250.33
See application file for complete search history.

(56) References Cited

U.S. PATENT DOCUMENTS

| 6,516,491 | B2 | 2/2003 | Merkel et al. | |
| 6,643,889 | B1 | 11/2003 | Kotlarski | |
| 6,668,419 | B1 | 12/2003 | Kotlarski | |
| 2010/0205763 | A1* | 8/2010 | Ku | B60S 1/387 15/250.32 |
| 2012/0060316 | A1* | 3/2012 | Avasiloaie | B60S 1/381 15/250.33 |
| 2012/0144615 | A1* | 6/2012 | Song | B60S 1/4003 15/250.32 |
| 2013/0067674 | A1* | 3/2013 | Chiang | B60S 1/4003 15/250.32 |
| 2013/0067675 | A1* | 3/2013 | Chien | B60S 1/3851 15/250.32 |
| 2013/0152326 | A1* | 6/2013 | Oslizlo | B60S 1/387 15/250.33 |
| 2013/0185889 | A1* | 7/2013 | Tolentino | B60S 1/407 15/250.32 |
| 2015/0089764 | A1* | 4/2015 | Wu | B60S 1/407 15/250.32 |

FOREIGN PATENT DOCUMENTS

CN    DE 202012102614 U1 *   8/2012   .............. B60S 1/387

* cited by examiner

*Primary Examiner* — Michael Jennings
(74) *Attorney, Agent, or Firm* — Chun-Ming Shih; HDLS IPR Services

(57) ABSTRACT

A general wiper connecting apparatus (1) comprises: a main body (10) formed with a penetrated hole (13) allowing a pivotal shaft (2*a*') of a wiper driving arm (2, 2', 2") to be received; a head portion (20) formed with a positioning groove (21) at the location connected with the main body (10) for positioning the wiper driving arm (2, 2', 2"); a tail portion (30) formed with a pair of elastic clamping pieces (31) for latching the wiper driving arm (2, 2', 2"); and a pair of side boards (40) disposed at two sides of the main body (10), and respectively formed with a through hole (41) corresponding to the penetrated hole (13), and an insertion slit (400) is respectively formed between the pair of side boards (40) and the main body (10) for allowing the wiper driving arm (2, 2', 2") to be inserted.

9 Claims, 9 Drawing Sheets

GENERAL WIPER CONNECTING APPARATUS

BACKGROUND OF THE INVENTION

1. Field of the Invention

The present invention relates to a wiper structure for motor vehicle, especially a wiper connecting apparatus allowing various types of wiper driving arms to be assembled thereon.

2. Description of Related Art

The wiper used for a motor vehicle is usually installed at the outer side of a motor vehicle window, the wiper is connected with a wiper driving arm of the vehicle, thereby enabling the wiper to be driven by the wiper driving arm to reciprocally swing on the motor vehicle window and to apply an external force to a wiper strip for scraping foreign objects such as rainwater or stain on the motor vehicle window.

According to the wiper structural designs available in the marketplace, different type of wiper driving arm is desired to be adopted with respect to the vehicle manufacturer and the vehicle model, however, different type of wiper driving arm requires a specified connecting apparatus for connecting and securing the wiper strip. Take the wiper structures disclosed in the U.S. Pat. No. 6,516,491, U.S. Pat. No. 6,643,889 and U.S. Pat. No. 6,668,419 for example, the disclosed wiper structures all comprise a wiper driving arm and a specially-designed connecting apparatus. Because different type of wiper driving arm requires a specified connecting apparatus for connecting the wiper strip, the wiper manufacturer has to provide various types of connecting apparatuses to customers, so the price of wiper is inevitably increased and spare connecting apparatuses would become components which are unnecessarily wasted.

As such, the applicant of the present invention has devoted himself to develop a novel wiper connecting apparatus for improving and overcoming the above-mentioned shortages.

SUMMARY OF THE INVENTION

The present invention is to provide a general wiper connecting apparatus, capable of allowing various types of wiper driving arms to be assembled thereon thereby providing convenience in assembly.

In another aspect, the present invention is to provide a general wiper connecting apparatus, capable of preventing components from being unnecessarily wasted thereby achieving a goal of lowering the price of wiper.

Accordingly, the present invention provides a general wiper connecting apparatus, capable of connecting various types of wiper driving arms on a wiper securing seat, the wiper connecting apparatus comprises: a main body, formed with a front end and a rear end opposite to the front end, and formed with a penetrated hole allowing a pivotal shaft of the wiper driving arm to be received therein; a head portion, extended from the front end of the main body, and formed with a positioning groove at the location connected with the main body for positioning the wiper driving arm; a tail portion, extended from the rear end of the main body, and formed with a pair of elastic clamping pieces for latching the wiper driving arm; and a pair of side boards, disposed at two sides of the main body, wherein each of the side boards is respectively formed with a through hole corresponding to the penetrated hole, and an insertion slit is respectively formed between the pair of side boards and the main body for allowing the wiper driving arm to be inserted.

In comparison with related art, the connecting apparatus provided by the present invention is designed to correspondingly work with various types of wiper driving heads, the main body thereof is formed with the penetrated hole allowing the pivotal shaft of the wiper driving arm to be received therein, the head portion is formed with a positioning groove for positioning the wiper driving arm, the tail portion is formed with the pair of elastic clamping pieces for latching the wiper driving arm, the side boards are respectively and correspondingly formed with the through hole, and the insertion slit is respectively formed between the pair of side boards and the main body, thus an goal of connecting with various types of wiper driving arms is achieved and the assembly is simplified; moreover, the connecting apparatus of the present invention can be generally used for reducing the requirement of providing spare components and preventing the waste caused by unnecessary components thereby lowering the price of wiper.

DETAILED DESCRIPTION OF THE INVENTION

Preferred embodiments of the present invention will be described with reference to the drawings.

Figure 1:
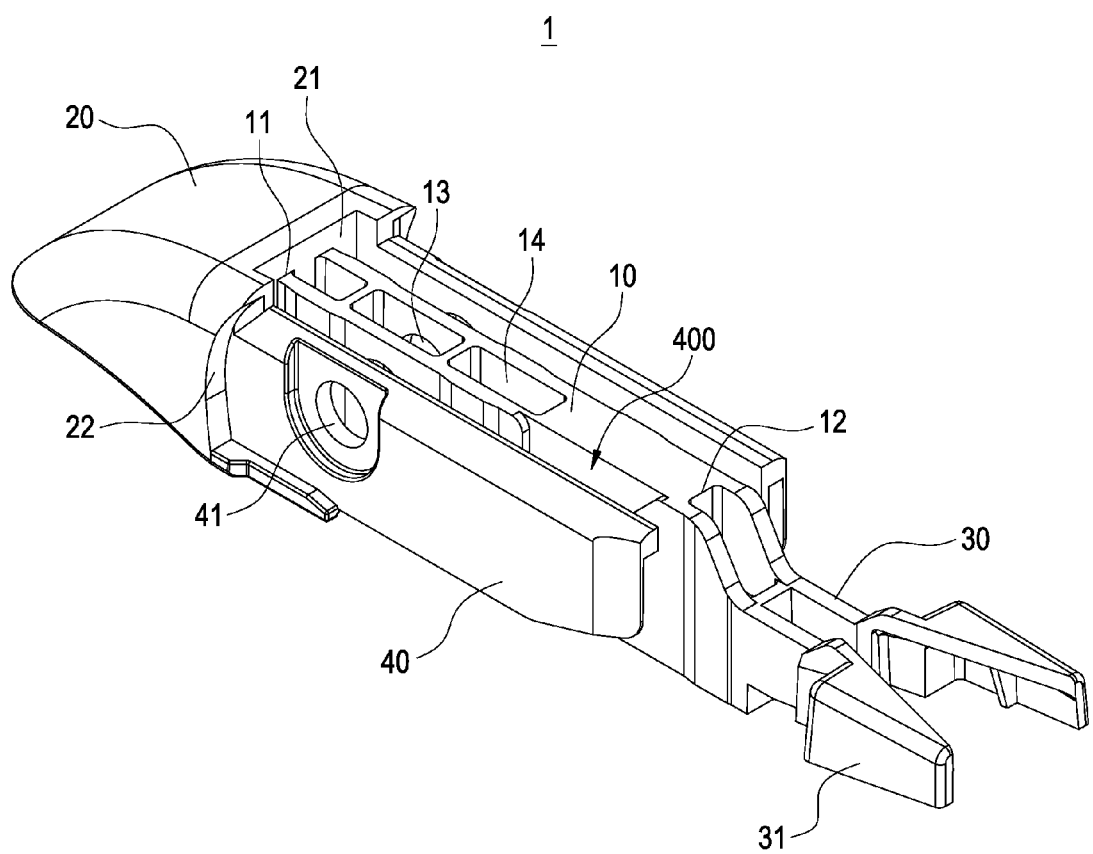
FIG. 1 is a perspective view showing the appearance of the wiper connecting apparatus according to the present invention.
Figure 2:
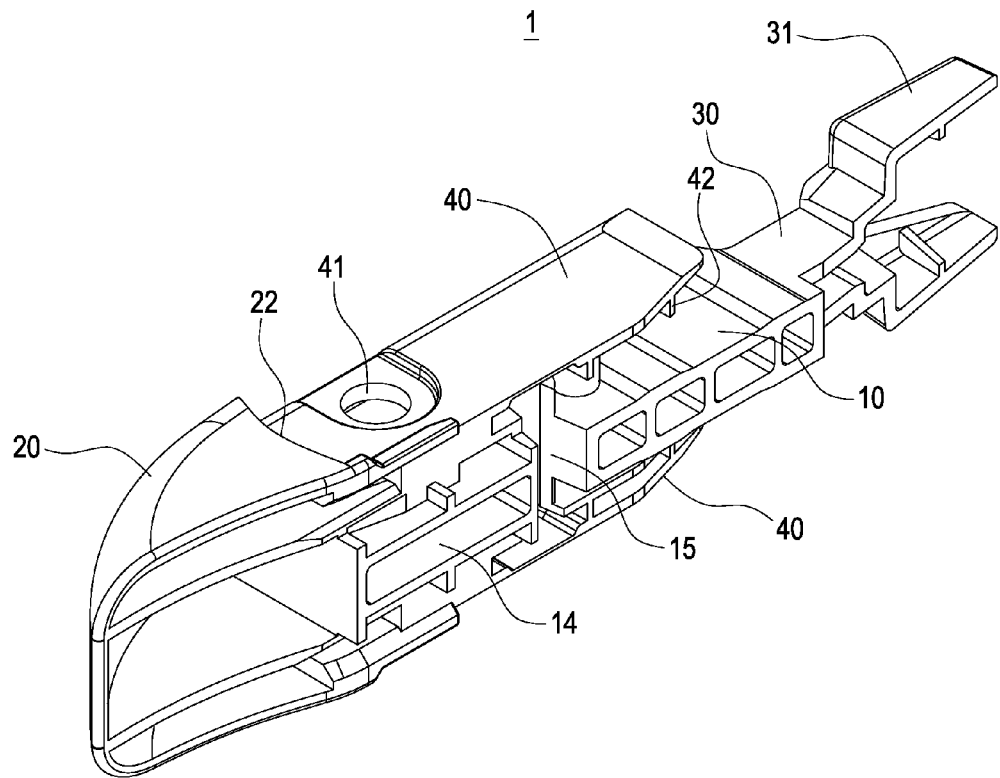
FIG. 2 is another perspective view showing the appearance of the wiper connecting apparatus according to the present invention.
Figure 3:
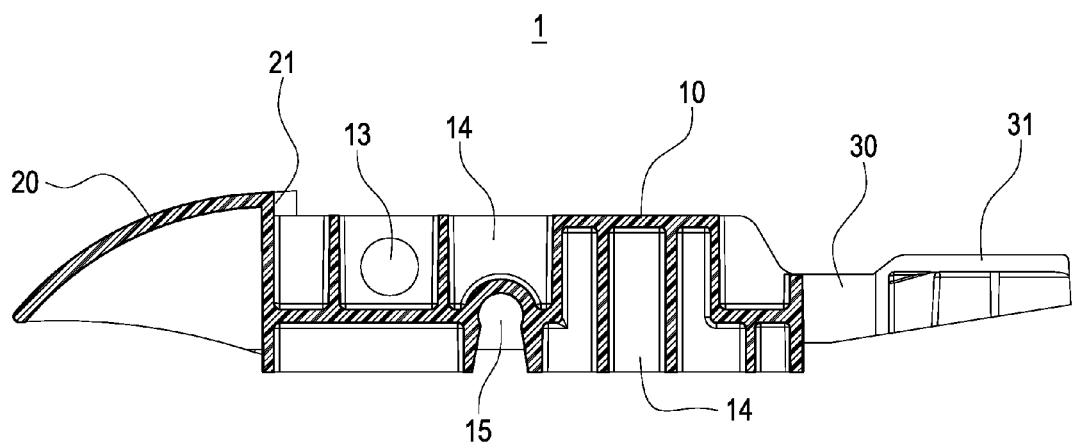
FIG. 3 is a cross sectional view showing the wiper connecting apparatus according to the present invention.

Please refer to FIG. 1 and FIG. 3, wherein FIG. 1 is a perspective view showing the appearance of the wiper connecting apparatus according to the present invention; FIG. 2 is another perspective view showing the appearance of the wiper connecting apparatus according to the present invention; and FIG. 3 is a cross sectional view showing the wiper connecting apparatus according to the present invention. The present invention provides a general wiper connecting apparatus (1), which comprises a main body (10), a head portion (20), a tail portion (30) and a pair of side boards (40).

The main body (10) is formed with a front end (11) and a rear end (12) opposite to the front end (11). The main body (10) is formed with a penetrated hole (13) penetrating the main body (10). The main body (10) is preferably formed with plural hollow grooves (14) arranged on the top and the bottom surface of the main body (10), the installation of the hollow grooves (14) is enabled to reduce the consumed material and the weight of the connecting apparatus (1). In addition, according to an embodiment of the present invention, the bottom surface of the main body (10) is formed with a securing groove (15) having a U-shaped cross section, and what shall be addressed is that the above-mentioned U-shaped cross section is adopted as an example for illustration and shall not be deemed as a limitation to the scope of the present invention.

The head portion (20) is outwardly extended from the front end (11) of the main body (10). The head portion (20) is formed with a positioning groove (21) at the location connected with the main body (10). Preferably, the width of the head portion (20) is wider than the width of the main body (10), the top surface of the positioning groove (21) is higher than the top surface of the main body (10), and the width of the positioning groove (21) is wider than the width of the main body (10). In addition, two sides of the head portion (20) are respectively formed with a positioning arc surface (22).

The tail portion (30) is extended from the rear end (12) of main body (10). The tail portion (30) is formed with a pair of elastic clamping pieces (31); according to this embodiment, the pair of clamping pieces (31) is formed in a fork shape.

The pair of side boards (40) is arranged at two sides of the main body (10), and each of the side boards (40) is respectively formed with a through hole (41) corresponding to the penetrated hole (13), and an inner wall of each of the side boards (40) is formed with plural ribs (42). An insertion slit (400) is respectively formed between the pair of side boards (40) and the main body (10). What shall be addressed is that the positioning groove (21) of the head portion (20) is in communication with the insertion slit (400).

Please refer from FIG. 4 to FIG. 10, the wiper connecting apparatus (1) provided by the present invention is capable of connecting various types of wiper driving arms (2, 2', 2") on a wiper securing seat (3).

Figure 4:
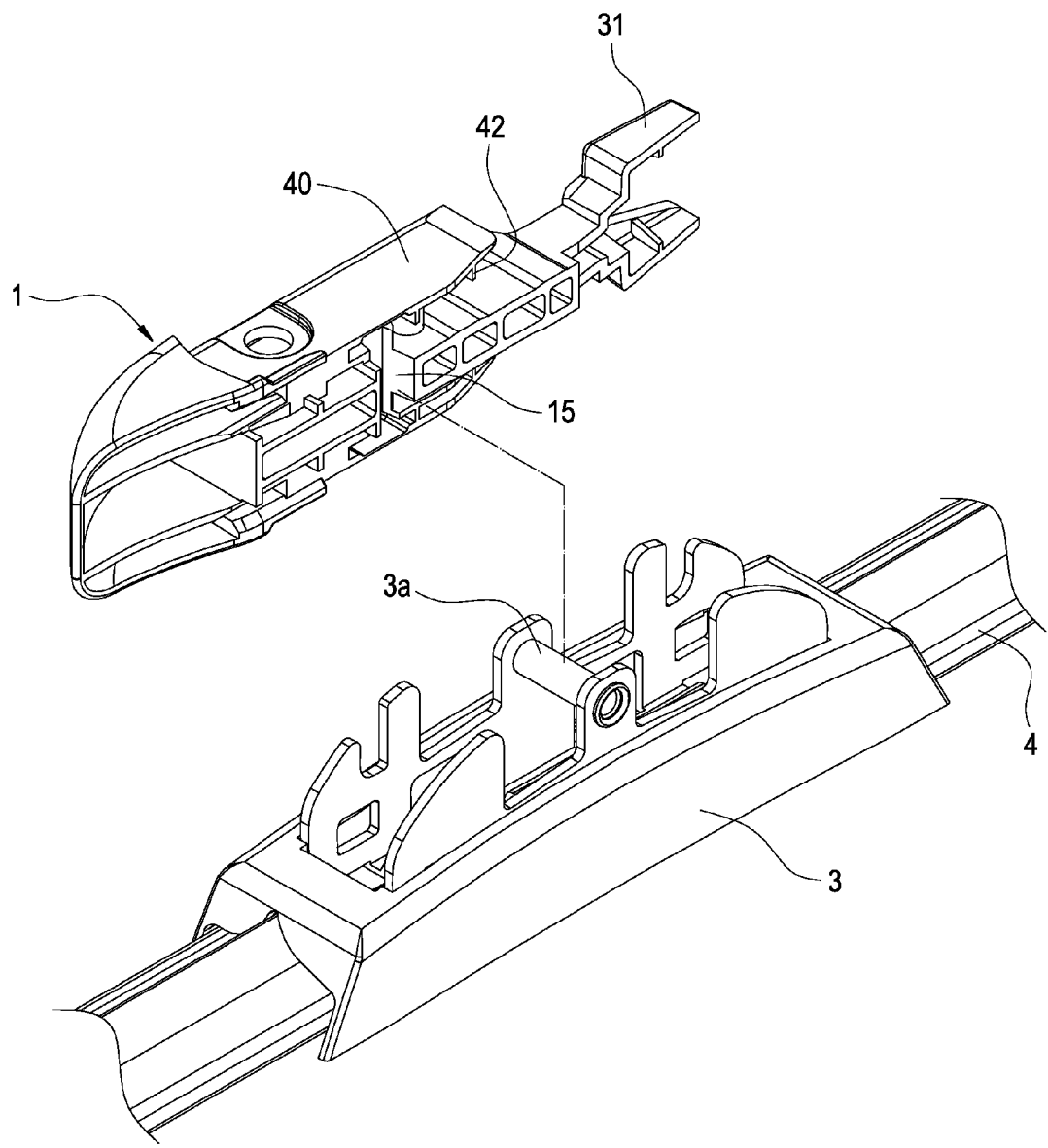
FIG. 4 is a schematic view illustrating the combination of the connecting apparatus for wiper and a securing seat according to the present invention.
Figure 5:
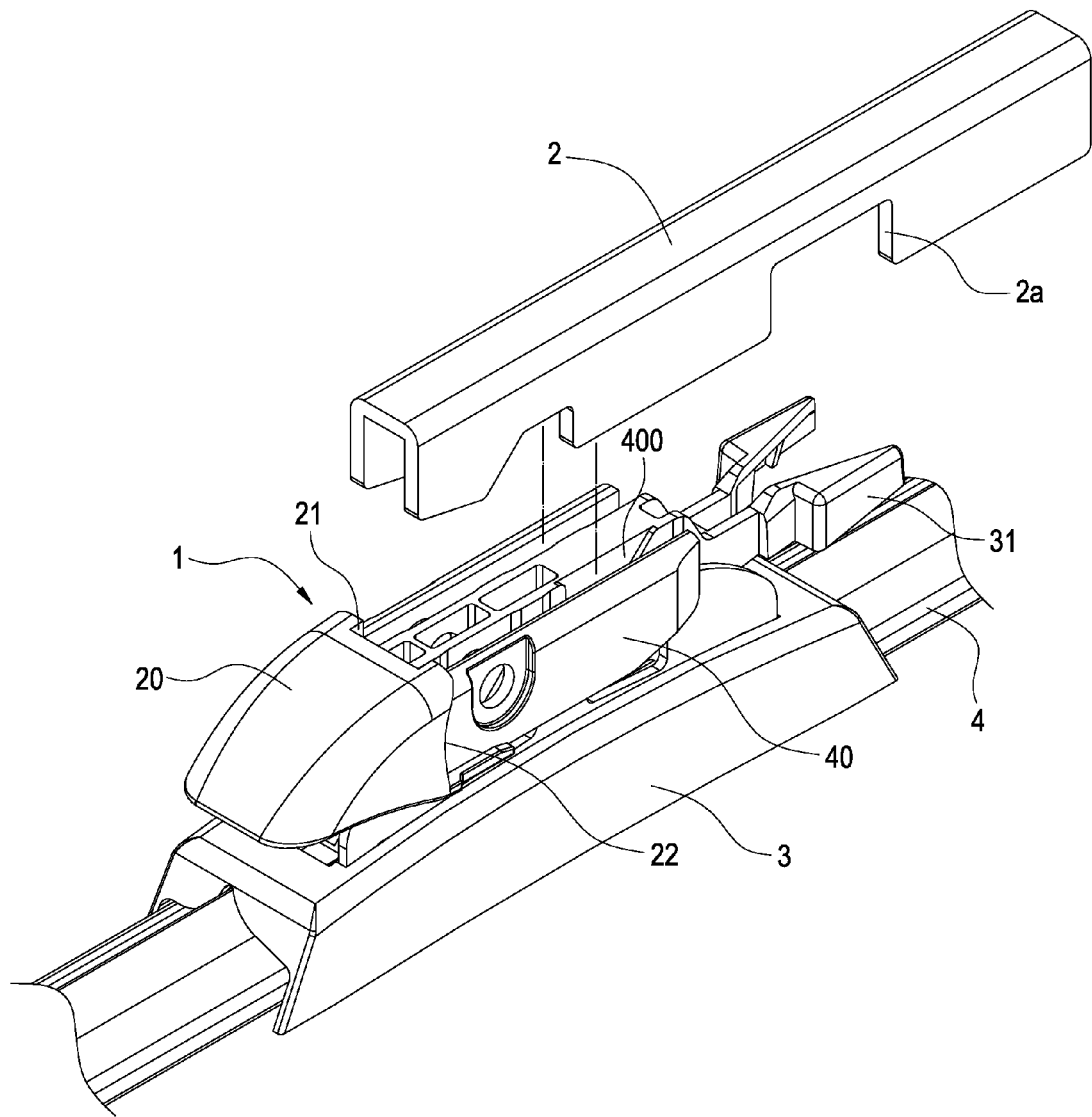
FIG. 5 is a schematic view illustrating the connecting apparatus being assembled with a wiper driving arm according to the present invention.
Figure 6:
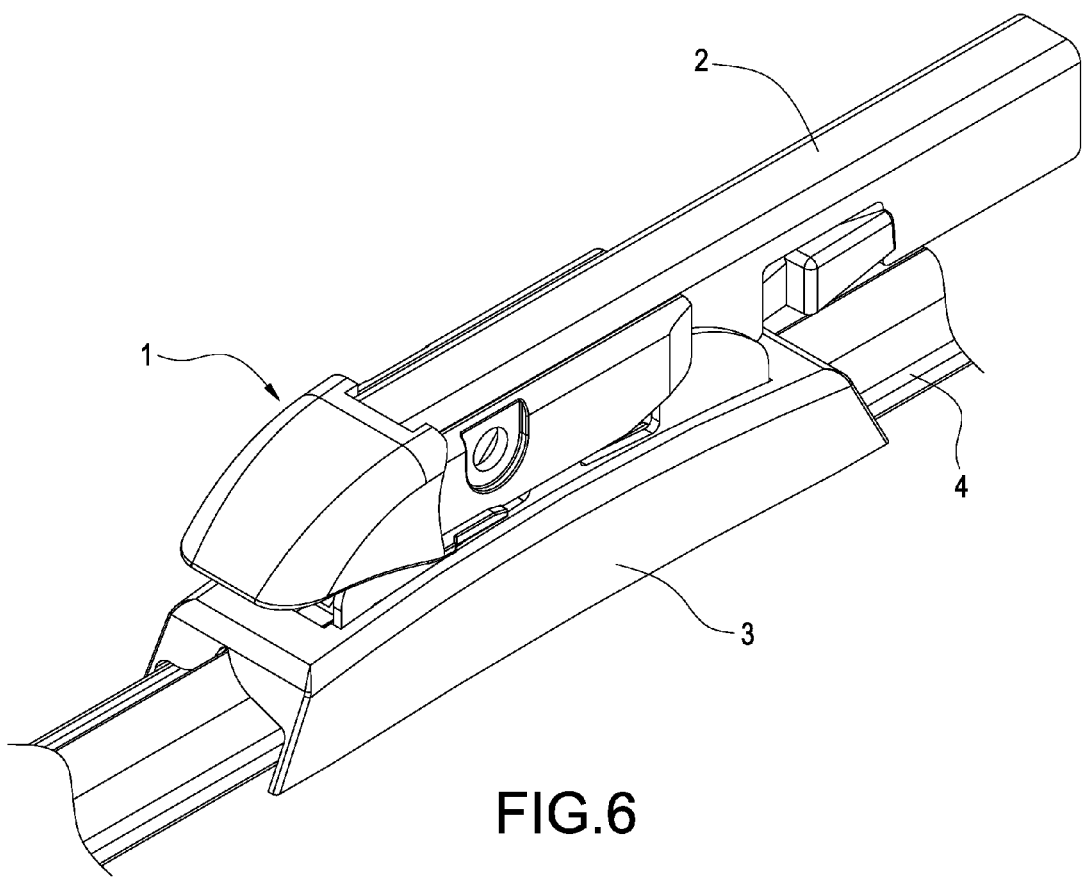
FIG. 6 is a perspective view showing the appearance of the assembled connecting apparatus according to the present invention.

Please refer from FIG. 4 to FIG. 6, wherein FIG. 4 is a schematic view illustrating the combination of the connecting apparatus for wiper and a securing seat according to the present invention; FIG. 5 is a schematic view illustrating the connecting apparatus being assembled with a wiper driving arm according to the present invention; and FIG. 6 is a perspective view showing the appearance of the assembled connecting apparatus according to the present invention. According to this embodiment, a wiper driving arm (2) is assembled on the connecting apparatus (1), and the securing seat (3) is formed with a securing shaft (3a), the bottom surface of the securing seat (3) is installed with a wiper strip (4).

As shown in FIG. 4, in assembling, firstly the securing groove (15) of the connecting apparatus (1) is correspondingly secured on the securing shaft (3a), thereby allowing the connecting apparatus (1) to be temporally positioned on the wiper securing seat (3).

Please refer to FIG. 5, which illustrates the wiper driving arm (2) being assembled, the wiper driving arm (2) is formed as a U-shaped elongated member, and the wiper driving arm (2) is formed with a set of opened grooves (2a). Two sides of the wiper driving arm (2) are correspondingly inserted in the insertion slits (400) of the connecting apparatus (1), one end of the wiper driving arm (2) is abutted against two sides of the positioning groove (21) for positioning the above-mentioned end of the wiper driving arm (2). At this moment, the ribs (42) of each of the side boards (40) are pressed at the outer surface of the wiper driving arm (2). Furthermore, the elastic clamping pieces (31) of the connecting apparatus (1) are correspondingly clamped on the set of opened grooves (2a) thereby allowing another part of the wiper driving arm (2) to be latched for assembling the wiper driving arm (2) on the connecting apparatus (1).

As shown in FIG. 6, after the assembly is finished, the wiper driving arm (2) is linked by the connecting apparatus (1) for driving the wiper strip (4) to performing operations of scraping and/or cleaning.

Figure 7:
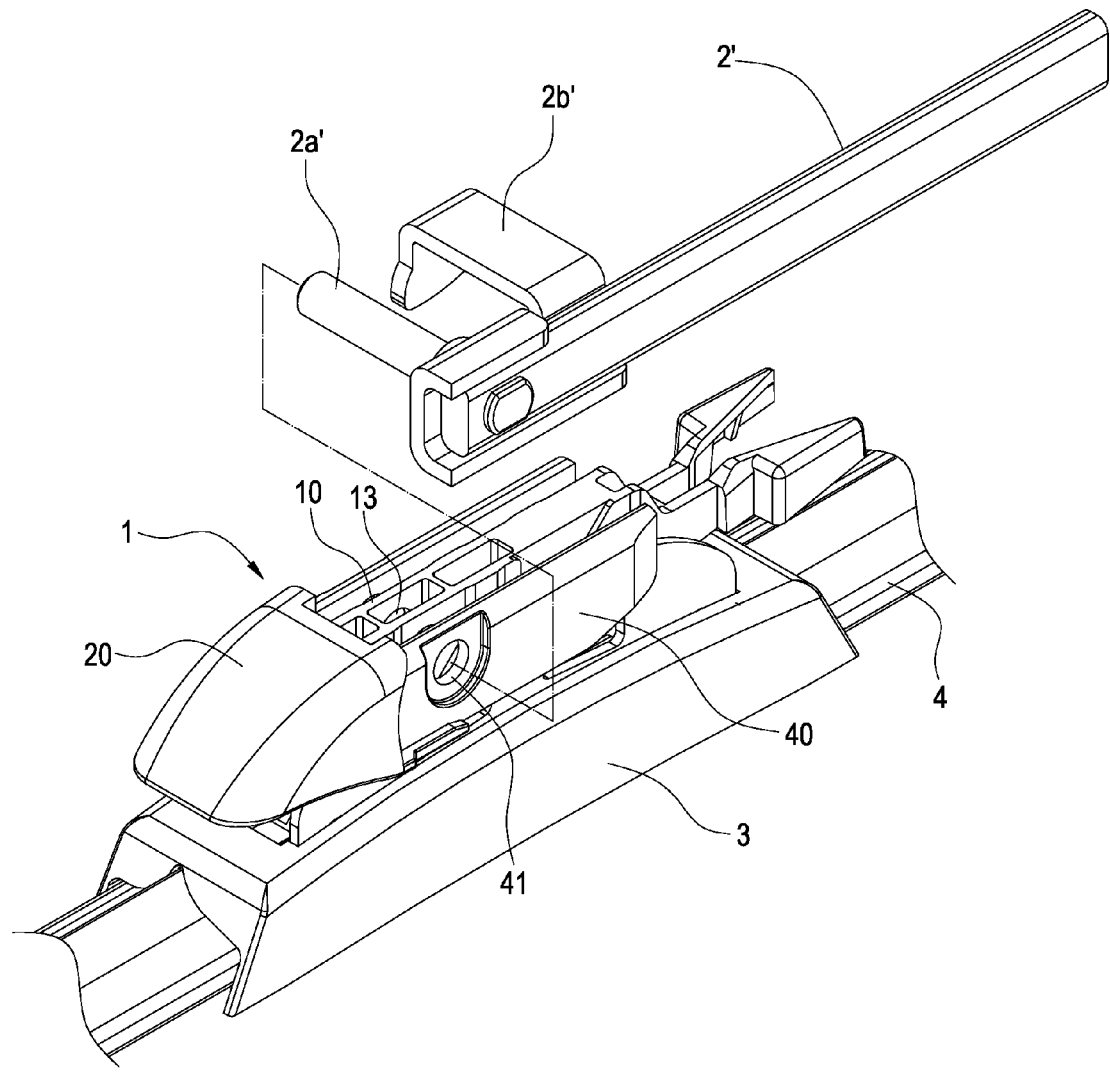
FIG. 7 is a schematic view illustrating the connecting apparatus being assembled with another wiper driving arm according to the present invention.
Figure 8:
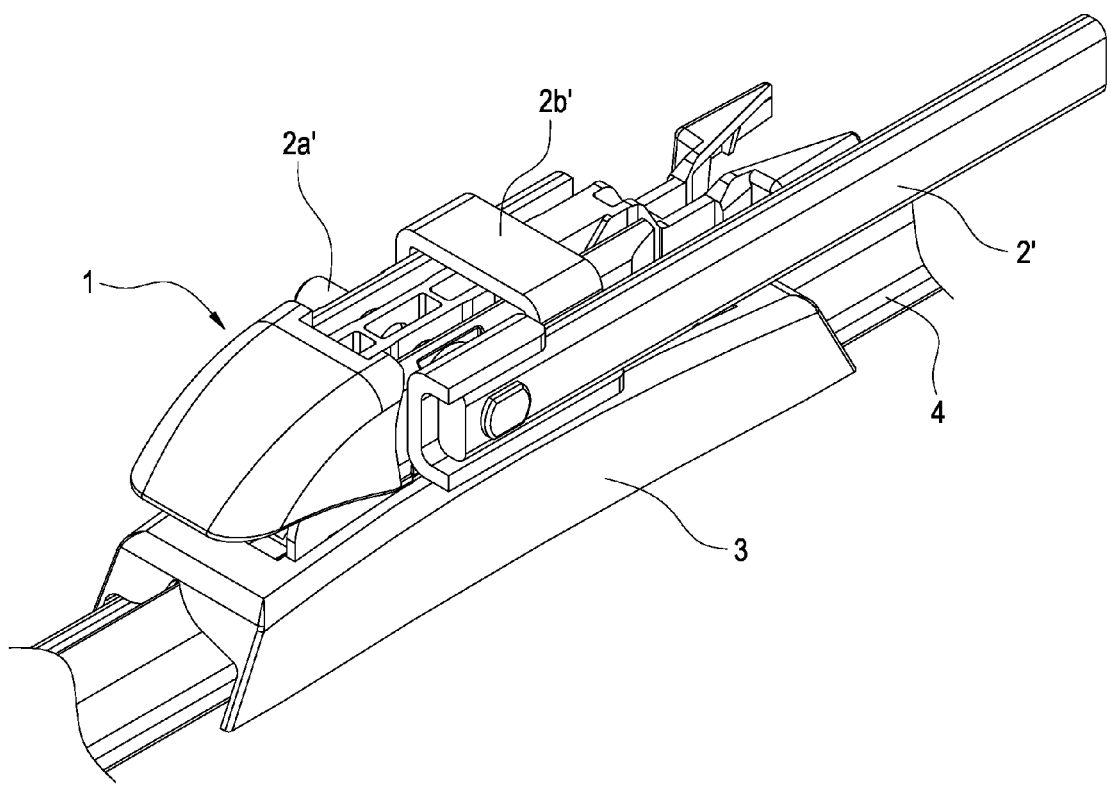
FIG. 8 is a perspective view showing the appearance of the connecting apparatus assembled with the another wiper driving arm according to the present invention.

Please refer to FIG. 7 an FIG. 8, wherein FIG. 7 is a schematic view illustrating the connecting apparatus being assembled with another wiper driving arm according to the present invention; and FIG. 8 is a perspective view showing the appearance of the connecting apparatus assembled with the another wiper driving arm according to the present invention. According to this embodiment, another wiper driving arm (2') is assembled on the connecting apparatus (1). The wiper driving arm (2') is formed with a pivotal shaft (2a') and a positioning cover (2b'). The pivotal shaft (2a') is received in the through holes (41) of the pair of side boards (40) and the penetrated hole (13) of the main body (10). Moreover, the positioning cover (2b') is served to cover the main body (10) and one side of the pair of side boards (40), thereby allowing the wiper driving arm (2') to be assembled on the connecting apparatus (1).

Figure 9:
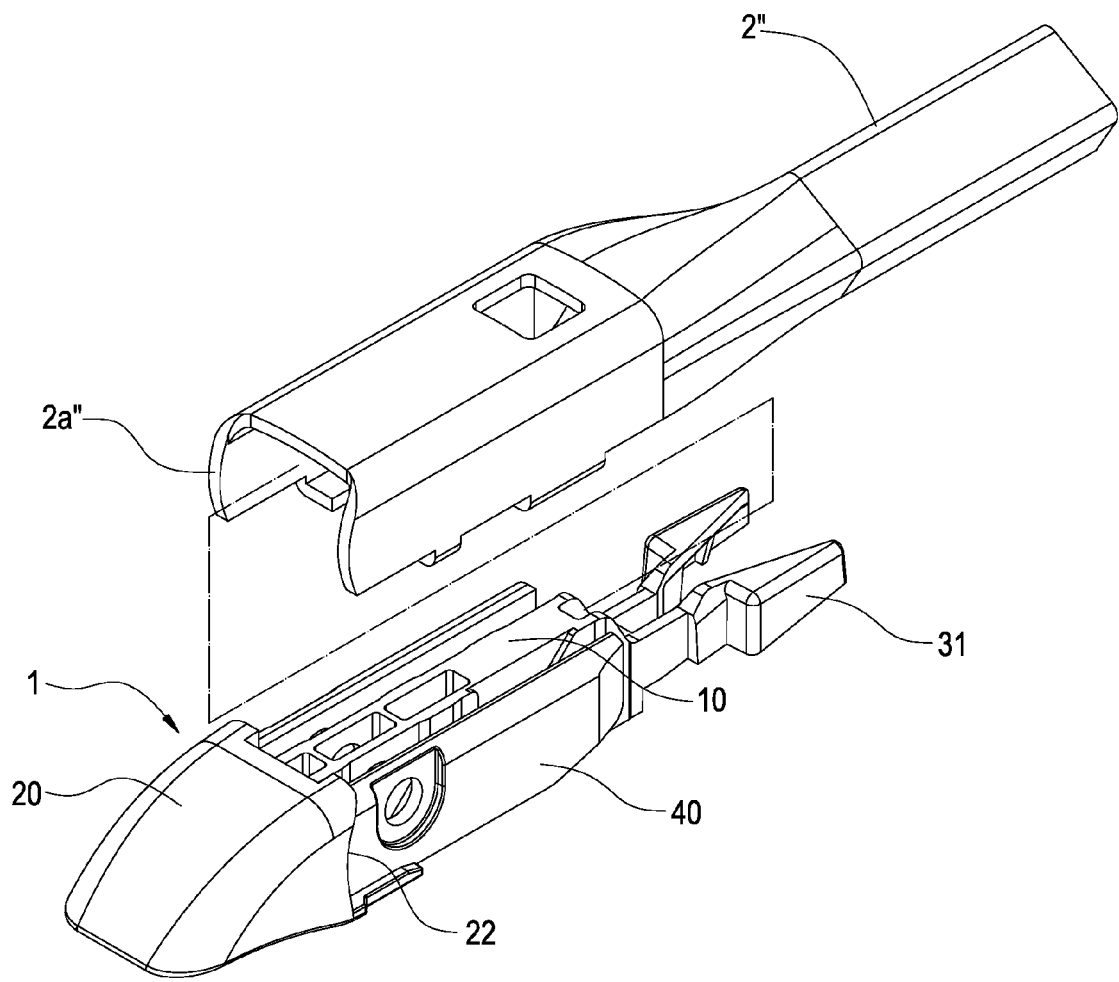
FIG. 9 is a schematic view illustrating the connecting apparatus being assembled with one another wiper driving arm according to the present invention.
Figure 10:
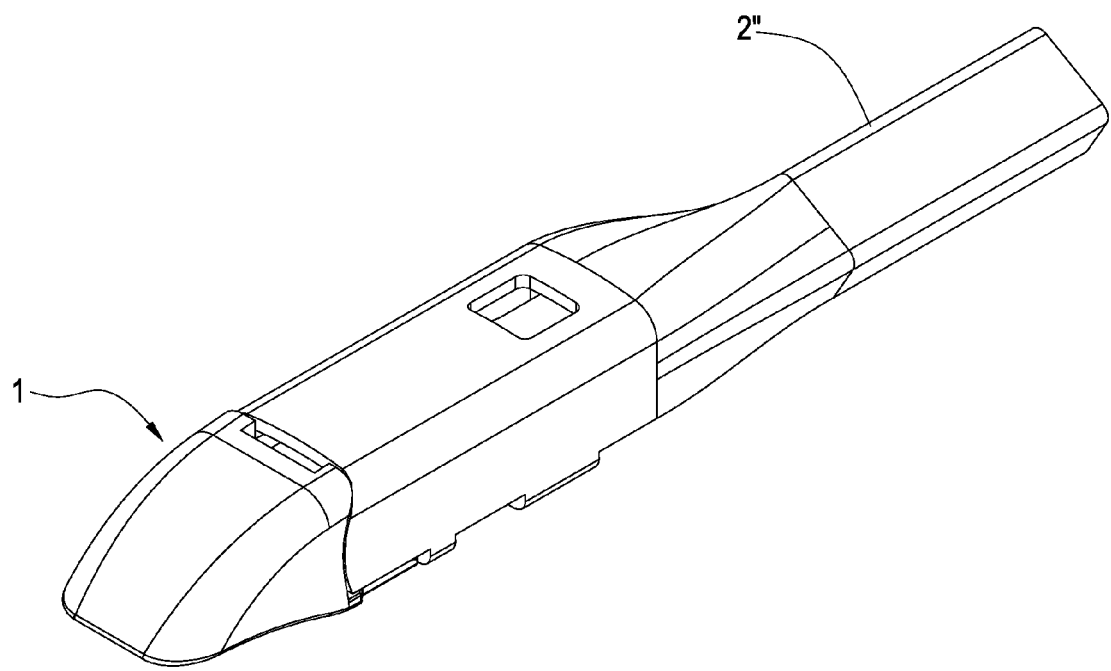
FIG. 10 is a perspective view showing the appearance of the connecting apparatus assembled with the one another wiper driving arm according to the present invention.

Please refer to FIG. 9 and FIG. 10, wherein FIG. 9 is a schematic view illustrating the connecting apparatus being assembled with one another wiper driving arm according to the present invention; and FIG. 10 is a perspective view showing the appearance of the connecting apparatus assembled with the one another wiper driving arm according to the present invention. According to this embodiment, one another wiper driving arm (2") is assembled on the connecting apparatus (1), and the front end of the wiper driving arm (2") is formed with an urging arc surface (2a").

According to this embodiment, the wiper driving arm (2") is connected with the connecting apparatus (1) with a sleeve means, at this moment, the urging arc surface (2a") is abutted on the positioning arc surfaces (22) formed at two sides of the head portion (20). In addition, the pair of elastic clamping pieces (31) is respectively and outwardly abutted against an inner surface of the wiper driving arm (2"), thereby allowing the wiper driving arm (2") to be assembled on the connecting apparatus (1).

What is claimed is:

1. A general wiper connecting apparatus (1), for connecting various types of wiper driving arms (2, 2', 2") on a wiper securing seat (3), comprising:
    a main body (10), formed with a front end (11) and a rear end (12) opposite to the front end (11), and formed with a penetrated hole (13) allowing a pivotal shaft (2a') of the wiper driving arm (2, 2', 2") to be received therein;
    a head portion (20), extended from the front end (11) of the main body (10), and formed with a positioning groove (21) at the location connected with the main body (10) for positioning the wiper driving arm (2, 2', 2");
    a tail portion (30), extended from the rear end (12) of the main body (10), and formed with a pair of elastic clamping pieces (31) for latching the wiper driving arm (2, 2', 2"); and
    a pair of side boards (40), disposed at two sides of the main body (10),
    wherein each of the side boards (40) is formed with a through hole (41) corresponding to the penetrated hole (13), and two insertion slits (400) are formed between the pair of side boards (40) and the main body (10) for allowing the wiper driving arm (2, 2', 2") to be inserted, and wherein two ends of the positioning groove (21) are in communication with the two insertion slits (400) respectively, and one end of the wiper driving arm (2, 2', 2") is abutted against the two ends of the positioning groove (21).

2. The general wiper connecting apparatus according to claim 1, wherein the securing seat (3) is formed with a securing shaft (3*a*), the bottom surface of the main body (10) is formed with a securing groove (15), and the securing groove (15) is correspondingly secured on the securing shaft (3*a*).

3. The general wiper connecting apparatus according to claim 1, wherein the main body (10) is formed with plural hollow grooves (14).

4. The general wiper connecting apparatus according to claim 3, wherein the hollow grooves (14) are arranged on the top surface and the bottom surface of the main body (10).

5. The general wiper connecting apparatus according to claim 1, wherein the top surface of the positioning groove (21) is higher than the top surface of the main body (10).

6. The general wiper connecting apparatus according to claim 5, wherein the width of the positioning groove (21) is wider than the width of the main body (10).

7. The general wiper connecting apparatus according to claim 1, wherein the width of the positioning groove (21) is wider than the width of the main body (10).

8. The general wiper connecting apparatus according to claim 1, wherein the pair of clamping pieces (31) is formed in a fork shape.

9. The general wiper connecting apparatus according to claim 1, wherein an inner wall of each of the side boards (40) is formed with plural ribs (42), and the ribs (42) are pressed at the outer surface of the wiper driving arm (2, 2', 2").

\* \* \* \* \*